US009323667B2

(12) United States Patent
Bennett

(10) Patent No.: US 9,323,667 B2
(45) Date of Patent: Apr. 26, 2016

(54) SYSTEM AND METHOD FOR MANAGING TRIM OPERATIONS IN A FLASH MEMORY SYSTEM USING MAPPING TABLES AND BLOCK STATUS TABLES

(71) Applicant: Violin Memory Inc., Mountain View, CA (US)

(72) Inventor: Jon C.R. Bennett, Sudbury, MA (US)

(73) Assignee: VIOLIN MEMORY INC., Santa Clara, CA (US)

( * ) Notice: Subject to any disclaimer, the term of this patent is extended or adjusted under 35 U.S.C. 154(b) by 374 days.

(21) Appl. No.: 13/860,118

(22) Filed: Apr. 10, 2013

(65) Prior Publication Data

US 2013/0275660 A1 Oct. 17, 2013

Related U.S. Application Data

(60) Provisional application No. 61/623,301, filed on Apr. 12, 2012.

(51) Int. Cl.
*G06F 12/02* (2006.01)
*G06F 17/30* (2006.01)

(52) U.S. Cl.
CPC ........ *G06F 12/0292* (2013.01); *G06F 12/0246* (2013.01); *G06F 12/0253* (2013.01); *G06F 17/30218* (2013.01); *G06F 2212/7201* (2013.01); *G06F 2212/7205* (2013.01); *G06F 2212/7209* (2013.01)

(58) Field of Classification Search
CPC ............ G06F 12/0246; G06F 12/0292; G06F 12/0253; G06F 2212/7201; G06F 2212/7205; G06F 2212/7209; G06F 2212/2022; G06F 17/30218
See application file for complete search history.

(56) References Cited

U.S. PATENT DOCUMENTS

| | | | |
|---|---|---|---|
| 2009/0222643 A1 | 9/2009 | Chu | |
| 2010/0325351 A1 | 12/2010 | Bennett | |
| 2011/0225346 A1 | 9/2011 | Goss et al. | |
| 2012/0054465 A1* | 3/2012 | Post et al. | 711/206 |
| 2012/0059976 A1* | 3/2012 | Rosenband et al. | 711/103 |
| 2012/0110249 A1* | 5/2012 | Jeong et al. | 711/103 |
| 2013/0151754 A1* | 6/2013 | Post | G06F 12/0246 |
| | | | 711/103 |
| 2014/0095767 A1* | 4/2014 | Trika et al. | 711/103 |

FOREIGN PATENT DOCUMENTS

KR 10-2010-0065702 A 6/2010

OTHER PUBLICATIONS

PCT Search Report in related application No. PCT/US2013/036295 mailing date Oct. 23, 2014 (5 pgs).
Kuo, Tei-Wei et al., "Special Issues in Flash," 2008 IEEE/ACM International Conference on Computer-Aided Design, San Jose, CA, Nov. 13, 2008, pp. 821-826.
International Search Report for International Application No. PCT/US2013/036295, dated Jul. 23, 2013, 2 pages.

* cited by examiner

*Primary Examiner* — Tuan Thai
*Assistant Examiner* — Glenn Gossage
(74) *Attorney, Agent, or Firm* — Brinks Gilson & Lione

(57) ABSTRACT

A method and system for managing a flash memory system facilitates the use of TRIM or similar operations so as to release physical memory space of logical block addresses (LBAs) that are declared to be deleted by a user file management system. A plurality of data structures corresponding to levels of indirection are used to manage the mapping between a user logical block address and the physical location of the data in the flash memory system and to respond to user read and write requests by determining the current status of the user logical block address in the frame of reference of the memory system. This process substantially decouples TRIM management from garbage collection and wear leveling operations.

2 Claims, 5 Drawing Sheets

|     | C1 |    |     |
|-----|----|----|-----|
| B1  | P1 |    | B3  |
|     | P2 |    |     |
|     | P3 |    |     |
|     | P4 |    |     |
| B2  | P1 | P1 | B4  |
|     |    |    |     |
|     |    |    |     |
|     |    |    |     |

|     | C2 |    |     |
|-----|----|----|-----|
| B1  | P1 | P1 | B3  |
|     |    |    |     |
|     |    |    |     |
|     |    |    |     |
| B2  | P1 | P1 | B4  |
|     |    |    |     |
|     |    |    |     |
|     |    |    |     |

|     | C3 |    |     |
|-----|----|----|-----|
| B1  | P1 | P1 | B3  |
|     |    |    |     |
|     |    |    |     |
|     |    |    |     |
| B2  | P1 | P1 | B4  |
|     |    |    |     |
|     |    |    |     |
|     |    |    |     |

|     | C4 |    |     |
|-----|----|----|-----|
| B1  | P1 | P1 | B3  |
|     |    |    |     |
|     |    |    |     |
|     |    |    |     |
| B2  | P1 | P1 | B4  |
|     |    |    |     |
|     |    |    |     |
|     |    |    |     |

FIG. 3

| LBA | PBA | B | T |
|---|---|---|---|
| 1 | | | |
| 2 | | | |
| 3 | | | |
| 4 | PBA3 | | 0 |
| 5 | PBA1 | | 0 |
| 6 | | | |
| 7 | | | |
| 8 | | | |
| 9 | | | |
| 10 | PBA6 | | 1 |
| 11 | | | |
| 12 | | | |

"1" = TRIMed

"0" = Valid

FIG. 4A

| PBA | V |
|---|---|
| 1 | 1 |
| 2 | 0 |
| 3 | 1 |
| 4 | 1 |
| 5 | 1 |
| 6 | 0 |
| 7 | |
| | F |
| | F |
| | F |
| | . |
| | . |
| | . |

"1" = Valid

"0" = Invalid

SYSTEM AND METHOD FOR MANAGING TRIM OPERATIONS IN A FLASH MEMORY SYSTEM USING MAPPING TABLES AND BLOCK STATUS TABLES

This application claims the benefit of priority to U.S. Provisional application Ser. No. 61/623,301, filed on Apr. 12, 2013, which is incorporated herein by reference.

BACKGROUND

Hard disks and flash memories both provide for non-volatile data storage. Due to the historical sequence of development of these devices, the protocols for managing the storage of data on hard disks were quite mature by the time that flash memory systems reached the marketplace. Interface protocols such as Small Computer Systems Interface (SCSI), Serial Advanced Technology Attachment (Serial ATA or SATA) and the like, took account of the properties of hard disks. These properties include, for example, a fixed sector or page size and a fixed relationship between a logical block address (LBA) and a particular sector on a disk. These relationships need not be exposed to the user. Magnetic disk media have the property that new data may be written to a sector even if there is data presently written to the sector. The new data replaces or "overwrites" the old data without any overt operation to erase the data in the sector being needed.

In contrast, NAND flash memory, which is often used for products that emulate hard disks, or for larger memory systems that are to be managed using legacy interface protocols, has different properties and characteristics. While a NAND flash memory circuit may be written in units of, for example, a page size, data that is to be written to the flash memory circuit needs to be written to a page that has no current data. To provide such pages, the pages need to be "erased" and erasing can only be done for a plurality of contiguous pages known as a block. There may be, for example, 64 or 128 such pages in a block.

The relationship between the user logical block address (LBA) and the actual physical location of the page of data in the flash memory is managed by series of algorithms that are vendor specific, but are intended to accomplish at least the functions of "garbage collection" and "wear leveling." When data is written to an LBA, a particular physical block (memory page) address (PBA) is selected such that the data is written to a physical location that is mapped to the LBA by a table known as the logical-to-physical (L2P) table. This table may store other attributes of the LBA/PBA tuple as well. The Flash Translation Layer (FTL) typically organizes writes of new data to physical block addresses (PBAs) such that writes occur in sequentially ascending page order, or some order that is compatible with the specific flash circuit. The details of the writing operation may differ for single level cell (SLC), multiple level cell (MLC) and triple level cell (TLC) flash technologies, and similar details may differ as the technology evolves, such as stacked die and the like. The lower level details of the actual write operation are not typically of relevance to the user and are often hidden from the user. Since the logical block addresses (LBAs) may typically be written in any order to satisfy the needs of the using application or file management system, the relationship between the LBA and the PBA is complex.

A person of skill in the art would understand the difference between a block of flash memory, which may comprise a plurality of pages, grouped for management (e.g. erasure) purposes, a page of data having a logical block address (LBA), and the location of the page of data in the block of flash memory, the location having a physical block address (PBA) where the page of data referenced by the LBA is actually stored in the block of flash memory.

When the data being stored at a LBA is changed, the new (or updated) data for the LBA cannot be stored in the current PBA indicated in a logical-to-physical address (L2P) table, but needs to be stored in an unwritten ("free" or "erased") physical memory location. The FTL performs the allocation of a new PBA for the data, taking account of the restrictions previously mentioned, and updates the L2P table so that the LBA points to the new PBA. After some time, it will be appreciated that there will not be any remaining unwritten pages and, prior to that time, some of the previously used memory needs to be reclaimed ("garbage collected"). The PBAs that held data that was replaced by new data and stored elsewhere are no longer current and are not accessible to the user as they are no longer linked with an LBA in the L2P table. These pages may be called, "stale", "invalid" or the like. One would like to erase these pages; however, typically, the physical block in which the invalid pages reside still has some pages containing valid data that is referenced by the L2P table.

The garbage collection process may operate by moving the valid data pages of a block to PBAs in another block, and updating the L2P table accordingly. When all of the valid data has been moved, all of the PBAs of the block are now "invalid" and the block may be erased. This results in the reclaiming of physical memory locations that did not have useful data, so as to provide for an erased block of contiguous pages to continue the process of storing data.

File management systems developed for disk memory systems operate differently. For example, pages of data may be deleted from a file, or a file may be deleted, freeing the corresponding LBAs. The data that was recorded on the disk, but is no longer needed need not be erased from the disk as, when the physical page corresponding to a LBA is needed to write new data to the LBA, the new data is written to the physical page and directly overwrites the old (invalid) data. However, when such a file management system is managing a flash memory, and the flash memory is operated to emulate a disk, for example, there was no protocol for communicating the deletion of the LBAs to the flash page management software (FTL) as rendering the LBA and the associated PBA invalid. So, while the data in the LBAs, and the corresponding PBAs of the flash memory would no longer be needed or be accessible by the user, there was no indication of this situation at the L2P table interface with the FTL in a flash memory.

When the garbage collection process was executed on a block of pages of the flash memory, LBAs that may correspond to pages deleted by the file management system are still considered as having valid data in the PBA. Only when the user writes new data to the LBAs is the status of the PBA where the invalid data had been stored changed to "invalid", so it can be garbage collected. The terms "old", "stale," or the like, may also be used to represent invalid data. That is, data no longer of use to the user.

This means that if a block that is being garbage collected contains PBAs mapped to LBAs that have been deleted by the user file system, the status of the LBAs would still be considered as valid by the FTL. As valid LBA/PBA entries in the L2P table, the data stored in the flash memory pages would be relocated along with all of the other valid data during a garbage collection operation. Since a user may have deleted a significant number of pages from a file, the lack of awareness of this situation at the flash memory management level causes the relocation of data that could otherwise be erased as being invalid. Since relocating data takes time and system bandwidth, and flash memory circuits are also subject to wear associated with writing data, this situation may be undesirable. There may be a considerable area of memory filled with data that is no longer referenced by the user, but cannot be freed in advance of the user writing to the previously associated LBA.

So as to mitigate this problem, the (S)ATA industry standard has been modified to introduce a command known as TRIM (nota bene, while this term is usually capitalized, it is not an acronym.) When a TRIM command for a LBA or LBA range is received by a flash memory system and the FTL is configurable to process such a command, the corresponding LBAs and PBAs may be marked as invalid, and the space reclaimed by erasure when a garbage collection operation is performed, rather than first moving the invalid data to a new physical memory location. Should the LBA be written to again prior to a garbage collection operation on the block containing the PBA, the FTL operates as usual by finding a unwritten page, writing the new data to a newly selected PBA, and updating the L2P table by marking the PBA that held the old data as being invalid.

The corresponding SCSI protocol provides an UNMAP command and WRITE SAME (10, 16) command with unmap flag to accomplish the same purpose as TRIM. Herein, for simplicity any of these commands will be termed TRIM. At present neither protocol addresses the subject of a Redundant Array of Independent (or Inexpensive) Disks (RAID), where the RAID comprises at least two separate storage devices storing data having redundant properties (e.g., parity). The description herein relates to both redundant and non-redundant data storage.

SUMMARY

A method, a system, and a computer program product are described for the management of a flash memory, including: providing a controller configured to maintain a first table mapping between a user logical address and a physical address where data is stored; to maintain a second table indicating a status for each physical address of a block of physical addresses; and maintain a third table representing a user initiated data invalidation operation of the user logical address.

In an aspect, the controller is operative for accepting a user initiated data invalidation command for the user logical address and updating the first, the second, and the third tables to show the status of such invalidated logical and physical data addresses as invalid.

In another aspect, the controller is operative for receiving a read request from a user and using the third table to determine if the user logical address corresponds to a second table entry that is valid or invalid. If the table entry is invalid, the controller returns a value determined by a protocol. If the table entry is valid the first table is used to retrieve data corresponding to the read request from the physical address.

In a further aspect the controller is operative for receiving a write request from a user and using the third table to determine if the user logical address corresponds to a second table entry that is valid or invalid. If the third table entry is valid, the controller writes the data to a physical address allocated by the second table. If the third table entry is invalid, the controller updates the third table entry to valid and writes the data to a physical address allocated using the second table.

BRIEF DESCRIPTION OF THE DRAWINGS

FIG. 3 is a representation of the layout of an example memory circuit having a plurality of chips, each chip having a plurality of blocks of memory pages;

FIG. 4A is an example of a first mapping table, which may be, for example, an L2P table; and, FIG. 4B is an example of a second mapping table, which may be, for example, a block status bit mapping table.

DESCRIPTION

Figure 1A:
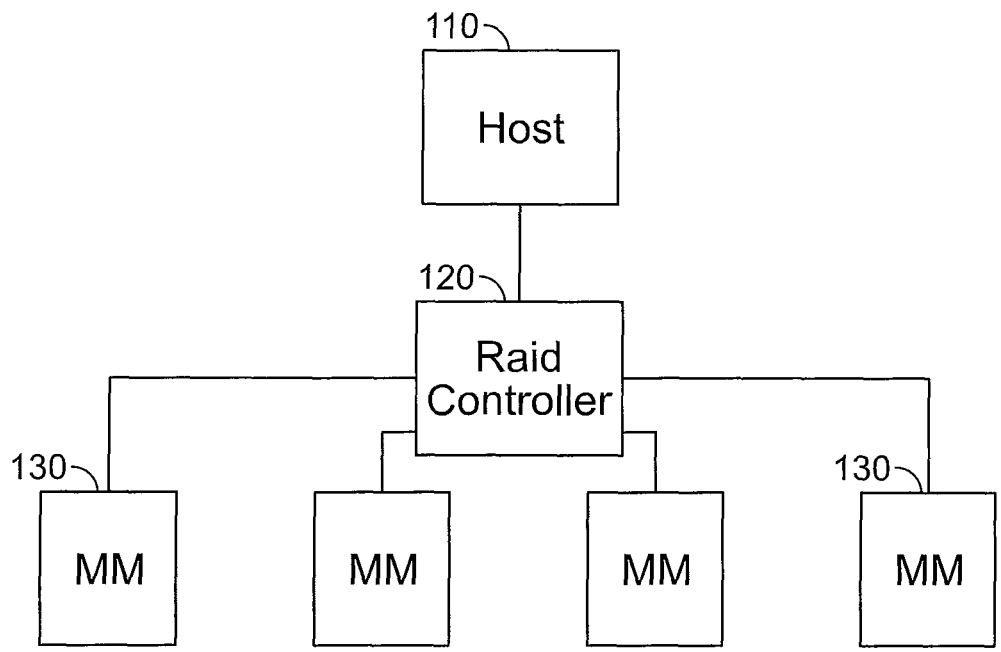
FIG. 1A is block diagram of a data storage system using RAID where the RAID controller manages a plurality of memory modules and has an interface to a host; and, FIG. 1B is a block diagram of a memory module having a memory controller and a plurality of memory circuits.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g., software, or in hardware, or in a combination of both. The machine-executable instructions can be used to cause a general-purpose computer, a special-purpose processor, such as a digital signal processor (DSP) or array processor, or the like, that acts on the instructions to perform functions described herein. Alternatively, the operations might be performed by specific hardware components that may have hardwired logic or firmware instructions for performing the operations described, or by any combination of programmed computer components and custom hardware components, which may include analog circuits. Such components may include an Application Specific Integrated Circuit (ASIC), Field Programmable Gate Array (FPGA), or the like.

The methods may be provided, at least in part, as a computer program product that may include a non-volatile machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., static RAM (S-RAM), dynamic RAM (D-RAM) phase-change RAM (P-RAM)); programmable read-only memory (PROM); electronically programmable read-only memory (EPROM); magnetic random access memory; magnetic disk storage media; flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or to produce a result, as is well known by persons skilled in the art.

FIG. 1A is a simplified block diagram of a memory system where a RAID controller 120 communicates with a host 110 to receive commands and data and to provide responses to requests from the host 110. Here, the host 110 is intended to represent the external user environment, and may be a network, a computer, or the like. For the present, we describe the operations as having been performed in a single memory module MM. However, these operations may be performed at any level of the memory system from the chip level to the overall memory system. The concept described herein operates properly in a RAID memory configuration providing, for example, that the LBAs of the data at the interface with the external environment are mapped so that any user LBA is associated with a local LBA (LLBA) at memory modules 130 of the memory system on which data of a particular RAID stripe is stored by the RAID controller. For simplicity, let us assume that the external (user) LBA and the LLBA on a memory module 130 have a one-to-one mapping, so as to use the term LBA for the logical location of the data. Of course, further indirection may be used.

Figure 1B:
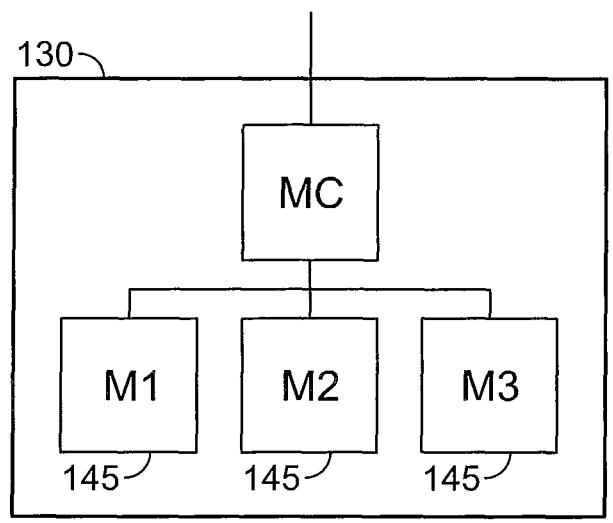

As shown in FIG. 1B, the memory module (MM) 130 may have a memory controller MC with an interface to the memory system bus and to a bus connecting to the FLASH memory circuits M (M1, M2, M3 in FIG. 1B) 145 associated with the memory module MM. Other features of the memory module MM that may relate to communication with other memory modules MM or the system memory controller are not shown, for simplicity.

Figure 2:
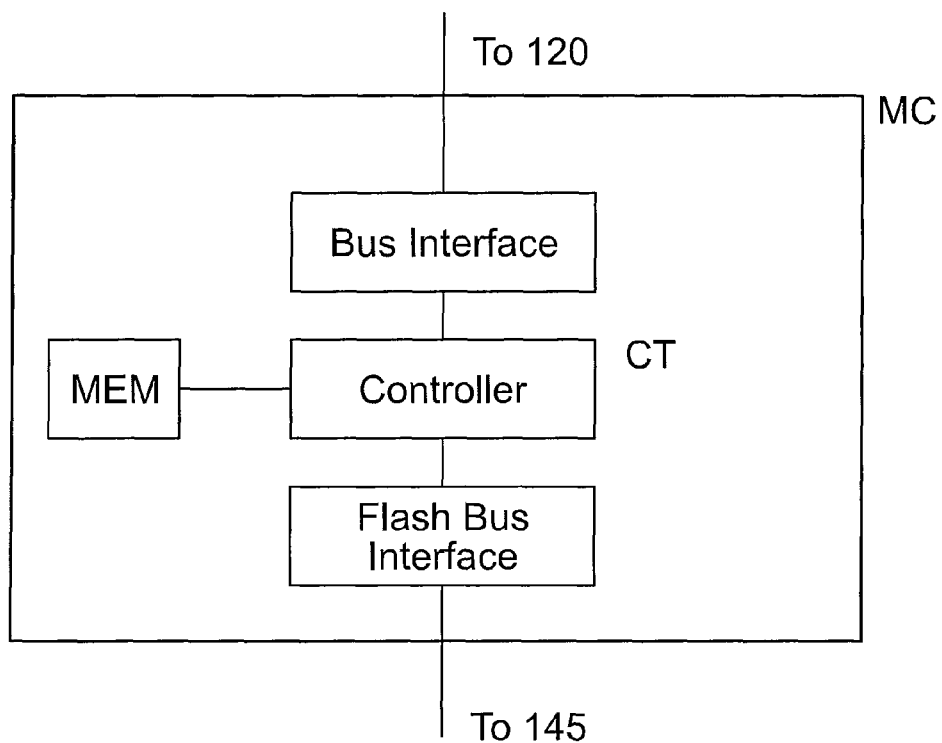
FIG. 2 is a block diagram of the memory controller of FIG. 1B.

FIG. 2 shows details of the memory controller MC of the memory module MM. In addition to the interface to the host or system bus and an interface to the FLASH memory bus, the MC has a controller CT, which may be a microprocessor, ASIC, FPGA or the like, and a working memory MEM. The working memory MEM may be volatile memory, non-volatile memory (NVM) or a combination of memory types selected to meet specific design requirements.

The working memory MEM may be used to store, amongst other information, data, the metadata for the data stored in the FLASH memory circuits 145, queues of operations to be performed, and the like. The metadata may include data needed to manage the FTL and other housekeeping operations of the memory module MM. The memory MEM may also store the instructions for controlling the microprocessor, controller, or the like.

FIG. 3 is a simplified representation of a flash memory circuit M (such as M1, M2, M3 in FIG. 1B). Each memory circuit (typically a packaged product) comprises a plurality of semiconductor chips C (C1-C4, for example). Each chip C may have a plurality of memory pages P configured so as to form blocks B. A typical memory page P (P1-P4, for example) may store 2048 bytes; there may be 128 memory pages P in a memory block B, and there may be 2048 blocks B (B1-B4, for example) on a chip C. This organization may be representative of currently available NAND flash memory circuits. However, the specific values and the organization of the memory are not intended to be limiting, as the components of the memory system are continually being evolved by component manufacturers.

While specific data structures are used for descriptive purposes herein, a person of skill in the art will appreciate that there are a variety of approaches to process of accounting for data location and status which may be used to achieve an equivalent result. The data structures may be located in volatile or non-volatile memory depending on access time, persistence requirements and other characteristics of the specific product design.

In an aspect, the L2P table of a MM may be as shown in FIG. 4A. The mapping of each of the LBA locations to a PBA is shown. Each block B of the flash memory of the MM has a bit map that indicates the status of each of the PBAs of the block (see FIG. 4B). Here, we use the convention that "1" represents a PBA where there is valid data and "0" represents a PBA where there is "invalid" data. The "invalid" data may be data that has been relocated, TRIMed or rendered stale by any process, and may be erased if otherwise permitted. The values in the table are valid for all locations having a lower value than a pointer BP which may be the value of the highest page number of the block B to which data has been previously written.

As previously described, when garbage collection is performed, data in PBAs that are valid may be moved to a destination that is not in the current block, and the associated source PBA marked as "invalid", until there are no more valid pages in the block and the block may be scheduled for erasure or is erased. When valid data is moved, the FTL associates the source PBA from which the data is being moved with the present value of the LBA in the L2P table, and updates the L2P table to point to the destination PBA of the valid data, which may be, for example, in another block B. Information needed to identify the LBA may be stored in the auxiliary data of the stored page P. The data itself remains associated with the same LBA, but the PBA where the data is being stored has changed. Physical pages of the block of pages that have been marked as "invalid" no longer have any association with the current L2P table. The data is still present, however, in the invalid pages until the block of pages containing the invalid pages is erased.

There may be two differing update mechanisms for the block status bit map. In a first mechanism, when new or modified data is to be written to an LBA, the FTL operates to select a free PBA from the L2P table. That is, the PBA has not been written to and is available for writing of data. Conceptually, this page is normally the next highest numbered free page in a block B. The L2P table is updated to point to the new PBA, and the bit map value associated with the previously-used PBA is updated to indicate that whatever data may be stored there is "invalid".

For example, in FIG. 4B, PBA2 has a value of "0," indicating that data stored there is invalid. So, when a garbage collection operation is performed on the block, the data in PBA2 need not be relocated, and may be erased when the block is erased. So, the L2P table may point to pages in more than one block and the association of LBAs with a specific block and page location will change as the system operates. When the block of pages has been erased, the pointer BP is reset to point to the first physical page address of the block. The block of pages may be placed in an "erased block" pool and the block made available for the writing of data at a time that may be controlled by the wear leveling algorithm, taking account of system memory availability needs.

Overall, the size (storage capacity) of physical memory may exceed the size of the LBA memory space made available to the user, as some memory space is needed for metadata storage, and for performing the garbage collection and wear leveling operations, as examples.

When the flash memory system receives a TRIM command from the external environment, the format of the command is generally that of a user logical unit number (LUN) and a LBA or LBA range within the user LUN. Depending on the system architecture, the LUN and LBA in user address space may be converted into a logical block address (LBA) within a flat memory address space of the flash memory system. Ultimately this LBA is mapped to the LBA space of the L2P table of a memory module. To simplify matters, we consider that this has been done, and describe an example of how a TRIM command may be used to release PBAs of the flash memory that are no longer associated with a user LBA as a result of the TRIM command, so that these invalid PBAs may be made available for garbage collection.

One of the attributes of the LBA/PBA tuple in the L2P table may be a bit T that indicates whether the LBA has been trimmed (or TRIMed), where a logical "1" indicates that the LBA has been TRIMed, and a logical "0" indicates that the LBA has valid data. So, if a TRIM command for LBA=10 is received, the value of the attribute bit of LBA10 is set to "1". Since the L2P table maps the LBA10 to a particular PBA, e.g., PBA 6 (see FIG. 4B), the bit map entry for the PBA 6 can be altered such that the data in the PBA is marked as "invalid", since it is no longer needed or associated with a valid LBA.

The TRIM command protocol is still being finalized as an ATA standard, even though it is already being used, for example, in WINDOWS 7 and other available computer operating systems. There may be at least two versions of the command in the standard, depending on the protocol used to respond to a READ request to an LBA that has been TRIMed. The data returned may be deterministic or non-deterministic depending on a parameter of the command. By deterministic, one would understand that the data returned would always have a predetermined value. Typically this data value would be all zeros if the data of the LBA had been TRIMed. Other patterns may also be used; however, it is understood by the user that the data previously stored is no longer accessible through the READ command to the LBA. Where a non-deterministic response is specified, the data that was previously stored for the LBA may be returned, providing that the data has not been erased in the interim by a garbage collection operation.

Since the TRIM command in a shared file system may make the LBA available to another user, this discussion will focus on a situation where the TRIM command results in a deterministic read response. Thus, a READ to a LBA after a TRIM command for that LBA will return zero data value until data is written to the LBA.

Keeping track of the TRIMed LBAs may be done at as small a granularity of addressing as the TRIM command supports. Here we use a granularity equal to the size of a LBA.

Figure 5:
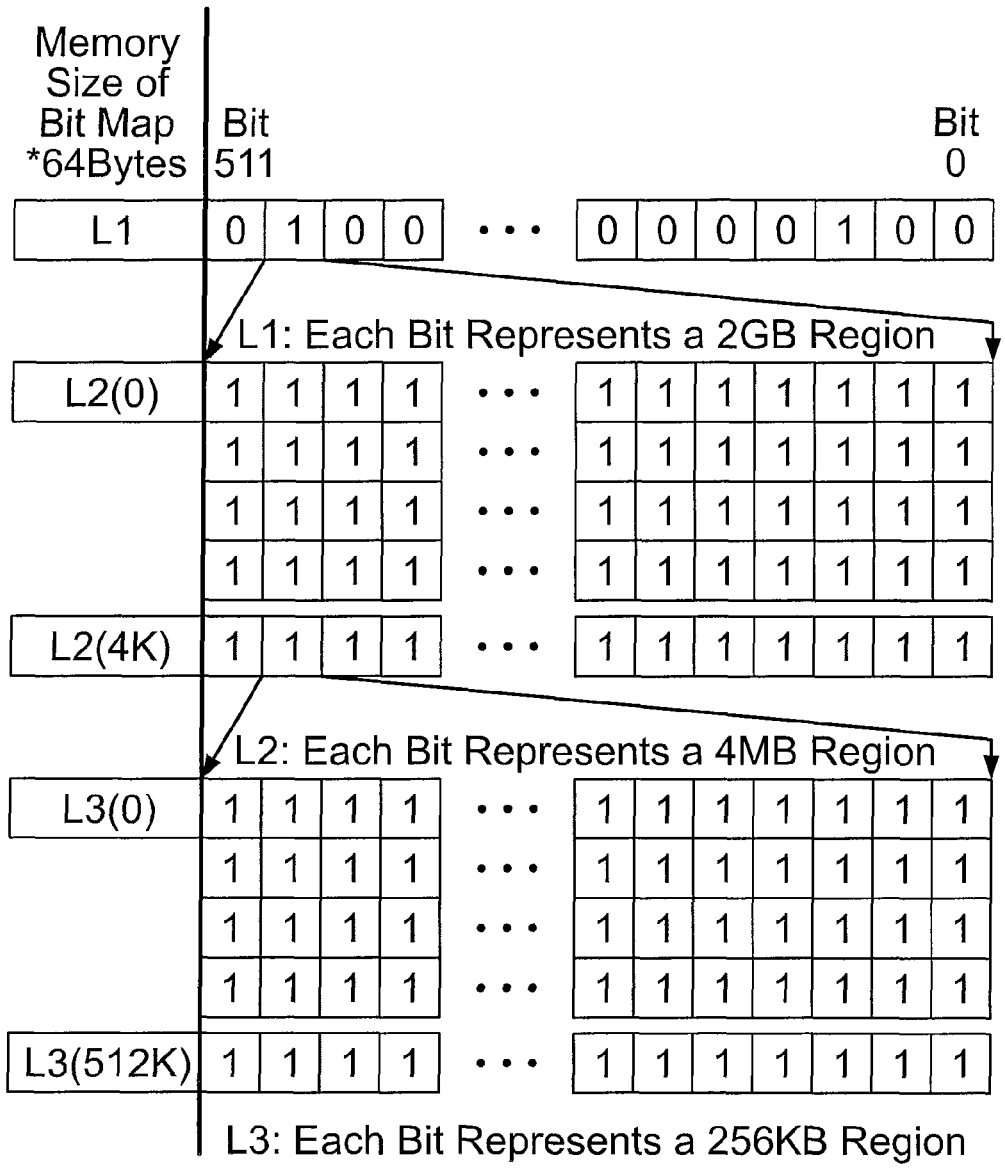
FIG. 5 is an example of a third mapping table.

FIG. 5 shows a data structure that may be used to represent the status of a LBA or block of LBAs. This is an example where the extent of the TRIM command is 1 terabyte (TB). That is, the TRIM command may result in zeroing up to an entire memory module having a user accessible capacity of 1 TB. Modules of other capacities and memory modules that may have been partitioned may be managed by appropriately sized and structured bit maps.

The function of the data structure may be understood using the pseudo-code fragment, where the statements evaluate TRUE when a bit in the bit map being referenced is "1".

When a READ command for an LBA, e.g., READ_LBA is received for, for example, LBA address 2151686144, which is (2 GB+4 MB+8 KB), one may decompose the address into a plurality of table indicies, LnLoc, as follows:

```
Addr = 2151686144 (binary 10000000010000000010000000000000)
Nbr_Addr = (Addr /8K) * 8K (Address rounded down to nearest 8K)
L1Loc = Addr/2GB = 1
L2Loc = (Addr % 2GB) / 4MB = 1
L3Loc = (Addr % 4MB) /8 = 1
for a read
if (L1TM[ L1Loc ] == 1) or
    (L2TM[ L1Loc ][ L2Loc ] == 1) or
      (L3TM[ (L1Loc * 512) + L2Loc][ L3Loc] == 1) or
      (L2P[Addr].TRIM_bit== 1) then
    /* return, (data available immediately, data is valid, data is TRIMed)
    */
else
    /* do regular read */
end
```

The level n=2 and n=3 maps may be referenced as if they were each 2 dimensional arrays of [512][512] bits and [256K] [512] bits, respectively (for a 2 TB MM, the dimensions would be [1K][512] and [512K][512], for a 4 TB [2K][512] and [1M][512], and so forth). In this example, a bit of the L1 table represents a 2 gigabyte (GB) range of addresses, a bit of the L2 table represents a 4 megabyte (MB) range of addresses and a bit of the L3 table represents a 256 kilobyte (KB) range of byte addresses. The actual arrays may be stored and accessed as data bytes.

FIG. 5 shows the state of the tables when an entire 2 GB LBA region starting at an address A and ending at address A+2 GB has been TRIMed. This may represent a situation where a LUN corresponding to this range of LBAs has been deallocated or TRIMed. A "1" represents a TRIMed LBA and a "0" is a LBA or range of LBAs for which data is still accessible by the user. So, in this example, where the tables are read at L1Loc[510], L1Loc[510]L2Loc[1] and [(L1Loc*512)+L2Loc][L3Loc], all of the values are TRUE, and the return function will provide a zero value as the LBA data, since the TRIM command in this example is deterministic. If an entire 2 GB LBA extent had been TRIMed, the table values (e.g., bit 0 to bit 511 in L1) referenced by the pseudo-code fragment would be "1" over the entire range of TRIMed LBAs. So, reading L1Loc [ ] alone would be sufficient to determine the status if the entire 2 GB extent had been TRIMed.

However, in this example, L1Loc[509] is zero, indicating that not all of the 2 GB extent has been TRIMed, and the values of L2Loc[ ] and possibly L3Loc[ ] need to be evaluated to determine if the address has been TRIMed. If L1Loc[ ]=L2Loc[ ][ ]=L3Loc[ ] [ ]==0, then none of the LBAs has been TRIMed, at least to a granularity of the size of a block of 8 LBA pages. The address decomposition may be continued further, and a L4 table also maintained. Alternatively, the TRIM status of an individual LBA in the block of 8 LBA pages may be maintained as part of the L2P table. Here, the L2P table is considered to have the lowest level of accounting for the TRIM function. If the TRIM bit is set to "0" in the L2P table then the data has not been TRIMed, and is available to be read. If the TRIM bit is set to "1" then the contents of the LBA have been TRIMed. So, whether the READ request to a particular LBA is acted on to return data from the memory is determined by analysis of the LBA address in the table structure. If the LBA is determined to be TRIMed, then there may not be an actual read access to the storage memory.

This data structure and evaluation approach determines the status of a LBA (TRIMed, or not TRIMed) in constant time for a READ operation, and would contribute to the efficient operation of a memory system where an awareness of the status of the LBAs is needed. Read accesses to the FLASH memory device itself may not be needed when the LBA has been TRIMed.

The data structure is also utilized for a write operation. If a WRITE operation is performed to an LBA, and the LBA has not been TRIMed, the result of evaluating the table is the same as for a READ operation where the data has not been TRIMed. That is, if L1Loc[ ]=L2Loc[ ][ ]=L3Loc[ ] [ ]==0, data is present in the LBA to which the WRITE is being directed and that data is accessible to the user for reading or writing. The WRITE command may be passed to the L2P table so that the FTL can store the new data in the indicated LBA at a new physical address, thus executing the WRITE command. Since the LBA to which the data being written to had not been TRIMed, the data structure continues to represent the logical status of the status of the storage memory.

For convenience of description, consider a situation where all of the LBAs in a memory module had been TRIMed. All of the T values in the table of FIG. 5 would have been set to "1" by the TRIM command. The corresponding bits in the block status bit maps (e.g., see FIG. 4B) would be set to "0". When a WRITE command is received under these circumstances the WRITE command represents a WRITE operation to a LBA that is in a TRIMed state, but is now being populated with user data. This would occur if the using program had reallocated the particular LBA to a new file or data set, or if the storage system management had reallocated this LBA to a new LUN and the new user was storing data. In either instance, the data would be written to the indicated LBA. The data written to the LBA would be associated with a PBA by the FTL and the data stored. The data structure of FIG. 5 would need to be updated so that a subsequent READ request to the LBA would be executed so as to return that data that had been written to the associated PBA. That is, all of the entries in the bit maps of FIG. 5 and the L2P table that would be accessed by decomposing the LBA address are now changed from "1" to "0".

For example, the pseudo-code fragment:

```
If L1TM[ L1Loc ] == 1 then (the entry covering addresses 2GB to
4GB-1)
    L1TM[ L1Loc ]=0
    L2TM[ L1Loc ][0-511]=1 (set all bits in the zone in the level 2
map that covers the addresses 2GB to 4GB-1)
    end
If L2TM[ L1Loc ][ L2Loc ] == 1 then (the entry covering addresses
2GB+4MB to 2GB+4MB-1)
    L2TM[ L1Loc ][ L2Loc ] =0
    L3TM[ (L1Loc * 512) + L2Loc][0-511] = 1 (set all bits in the
zone in the level 3 map that covers the addresses 2GB+4MB to
2GB+8MB-1)
    end
if L3TM[ (L1Loc * 512) + L2Loc][ L3Loc] == 1 then (the entry
covering addresses 2GB+4MB+8K to 2GB+4MB+15K)
    L3TM[ (L1Loc * 512) + L2Loc][ L3Loc] = 0
    /* set the trim bit in the L2P for the L2P entries for addresses
Nbr_Add, Nbr_Addr+1K,.....Nbr_Addr+7K; that is, the 8 1K sectors
whose L2P entries get read when the entry for Addr is read*/
    /* unset the trim bit in the L2P for Addr, and otherwise do
everything as if a regular write */
else
    /* do a regular write */
    end
```

The operations described by the code fragment above may be performed contemporaneously with the writing of the data to the LBA in non-volatile memory and the updating of the L2P table. In effect, a WRITE command overrides any TRIM condition for the LBA to which it is directed. So, while determining whether a LBA is TRIMed may not be needed to execute the WRITE command, the status of the LBA needs to be determined in the event that the data structure needs to be updated to cancel the TRIMed status of the LBA so as to permit subsequent reads to the LBA to return the stored data. Since the maintenance of the data structures can be performed separately from the processing of the WRITE command, the latency of the WRITE command may be same whether the LBA is TRIMed or not.

Another maintenance action on the data structure of FIG. 5 is the application of a TRIM command to a LBA or a range of LBAs. As an example, a TRIM command may specify a LBA or a continuous range of LBAs starting at a LBA address. The values in the data structure of FIG. 5 corresponding to the LBA or range of LBAs is typically "0", as the LBA would have been allocated to a particular file or LUN by the user. During the course of the operation of the user application, a file or other range of data may have been deleted, and the user application may, for example, act to release the LBAs so as to be reallocated to another user requirement. Alternatively, the user or the memory management system may wish to use the TRIM command as a convenient approach to effectively zeroing the contents of a LBA or range of LBAs. This may be useful in managing large blocks of logical memory being allocated to LUNs.

Once the data structure of FIG. 5 has been updated, and this update of the bit map has been applied to the L2P table, the status of each LBA may be mapped to the block status bit map of FIG. 4B, thus updating the actual status of the data stored in the PBAs. When a TRIM command has been propagated down to the physical memory level, the FTL is made aware of the change, and such parameters as the number of valid and invalid pages in a block may be updated and taken into consideration in managing glen garbage collection and wear leveling.

Eventually the updated block status bit map will be used during the management of the housekeeping operations and those PBAs containing data that had been TRIMed will not have to be moved to a new location prior to erasing of the block. By making the housekeeping operations aware of the status of the LBA with respect to the external environment, the number of PBAs in each block of the FLASH memory that may need to be moved is reduced, and the overhead associated with the housekeeping is correspondingly reduced. This contributes to improving the lifetime of the FLASH memory as fewer write operations are performed.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention.

What is claimed is:
1. A method of managing a flash memory comprising:
    providing a controller configured to:
        maintain a first table mapping between a user logical address and a physical address where data is stored in the flash memory;
        maintain a second table indicating a status for each physical address of a block of physical addresses;

maintain a third table representing a user initiated data invalidation operation of the user logical address;
wherein the controller is further operative for:
accepting a user initiated data invalidation command for the user logical address; and
updating the first, the second, and the third tables to show the status of an invalid logical and physical data address as invalid;
receiving a read request from a user and:
using an entry in the third table to determine if the user logical address corresponds to an entry in the second table that is valid or invalid; and
if the entry in the third table is invalid, return a value determined by a protocol; or,
if the entry in the third table is valid:
using the first table to retrieve data corresponding to the read request from the physical address;
receiving a write request from a user and:
using the entry in the third table to determine if the user logical address corresponds to an entry in the second table that is valid or invalid; and
if the entry in the third table is valid, writing data corresponding to the user logical address of the write request to a physical address allocated by the second table; or
if the entry in the third table corresponding to the user logical address of the write request is invalid, updating the entry in the third table to valid; and
writing data corresponding to the user logical address of the write request to a physical address allocated using the second table.

2. A non-transitory computer readable memory storing a computer program product, comprising:
instructions for configuring a controller to:
maintain a first table mapping between a user logical address and a physical address where data is stored in flash memory;
maintain a second table indicating a status for each physical address of a block of physical addresses;
maintain a third table representing a user initiated data invalidation operation of the user logical address;
wherein the controller is further operative for:
accepting a user initiated data invalidation command for the user logical address; and
updating the first, the second, and the third tables to show the status of invalid logical and physical data addresses as invalid;
receiving a read request from a user and:
using an entry in the third table to determine if the user logical address corresponds to a second table entry that is valid or invalid; and
if the entry in the third table is invalid, return a value determined by a protocol; or,
if the entry in the third table is valid, using the first table to retrieve data corresponding to the read request from the physical address;
receiving a write request from a user and:
using the entry in the third table to determine if the user logical address corresponds to an entry in the second table that is valid or invalid; and
if the entry in the third table is valid, writing data corresponding to the user logical address of the write request to a physical address allocated by the second table;
or
if the entry in the third table entry-corresponding to the user logical address of the write request is invalid:
updating the entry in the third table to valid; and
writing data corresponding to the user logical address of the write request to a physical address allocated using the second table.

\* \* \* \* \*